United States Patent Office 2,755,094
Patented July 17, 1956

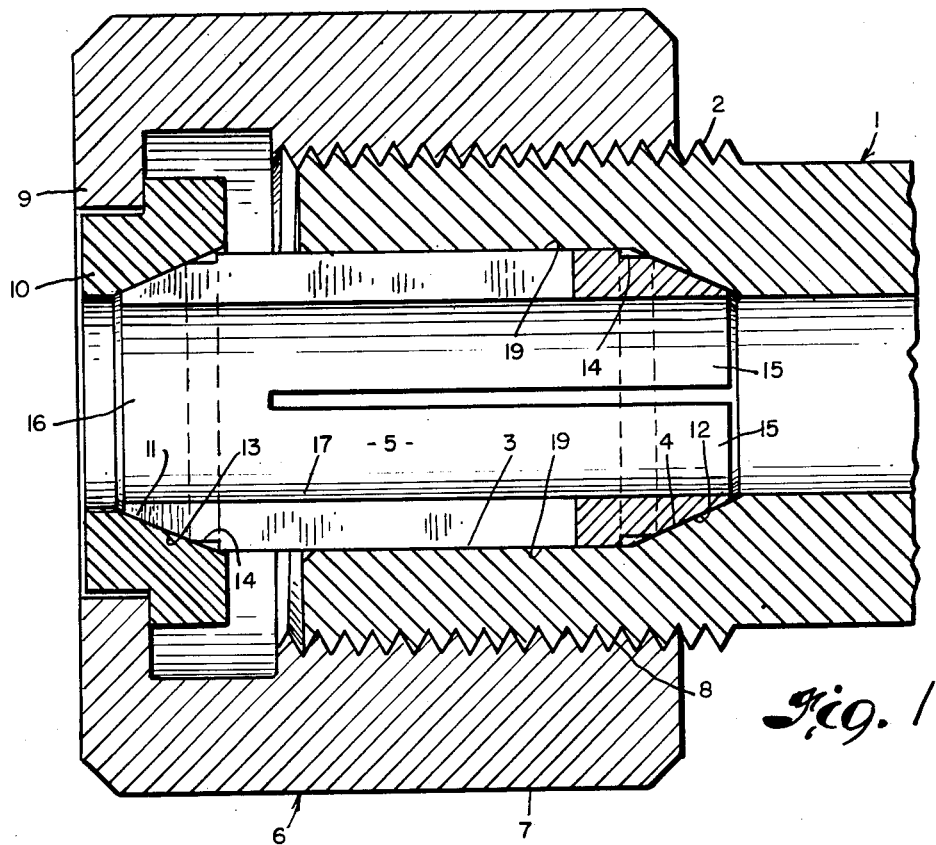
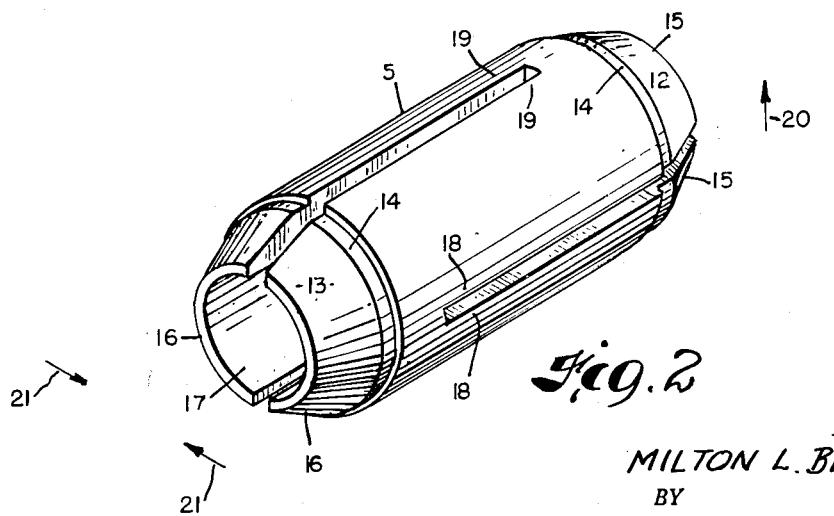

2,755,094
COLLET CHUCK

Milton L. Benjamin, Shaker Heights, Ohio, assignor to Erickson Tool Company, a corporation of Ohio Application June 22, 1951, Serial No. 233,001

1 Claim. (Cl. 279—51)

The present invention relates generally as indicated to a collet chuck and has for its main objects the provision of a collet chuck which is not only of a simple form for economy of manufacture, for interchangeability of the parts of one assembly for those of another, and for endwise reversibility of the collet thereof, but which in addition is of a form assuring the gripping of tools in coaxial relation therewith.

Other objects and advantages will become apparent as the following description proceeds.

To the accomplishment of the foregoing and related ends, the invention, then, comprises the features hereinafter fully described and particularly pointed out in the claim, the following description and the annexed drawing setting forth in detail one illustrative embodiment of the invention, this being indicative, however, of but one of the various ways in which the principle of the invention may be employed.

In said annexed drawing:

Fig. 1 is a diametrical cross section of one embodiment of the present invention; and Fig. 2 is a perspecitve view of the radially contractible collet employed in the Fig. 1 collet chuck.

In the drawing the numeral 1 denotes a tubular shank member exteriorly threaded as at 2 and formed with a cylindrical bore 3 terminating in an inturned frusto-conical seat 4, such seat preferably having an included or vertex angle of approximately 45° or generally say from 40–50° so as to render the collet 5 engaged therewith self-releasing while at the same time to enable firm gripping of the shank of a tool adapted to be inserted within said collet 5. The cylindrical bore 3 is relatively long compared to its diameter, for example in the ratio of about 1.2:1 and preferably not appreciably less than 1:1, so as to afford, as will become evident, a sturdy non-cocking support for said collet 5.

Secured to said tubular shank member 1 for relative axial movement is a two-part tubular nosepiece member 6 which comprises a nut 7 internally threaded as at 8 for engagement with the threads 2 of said shank member and formed with an inturned shoulder or rib 9, and a flanged nose-ring 10 engaged with such shoulder and formed with a frusto-conical seat 11 opposed to the seat 4 and oppositely inclined with respect thereto, the included or vertex angle of such seat 11 being preferably equal to that of the seat 4 whereby to cause equal contraction of the collet 5 at opposite ends. It is to be noted that there is lateral clearance between said nose-ring 10 and said nut 7 whereby eccentricity of the latter with respect to said shank member 1 will not cause a lateral shifting of said nose-ring to an eccentric position. As evident, said nose-ring 10 and said nut 7 may be integrally formed but it is preferred to make the nosepiece member 6 in two parts as shown so as to reduce the tendency of turning of said collet 5 when said nut 7 is rotated with respect to said shank member 1.

From the foregoing it is apparent that said tubular shank and nosepiece members 1 and 6 define opposed axially spaced and oppositely inclined seats 4 and 11 with a relatively long bore 3 extending from the shank seat 4 toward the nosepiece seat 11 but terminating short of the latter to enable relative axial movement between said nosepiece and shank members.

Engaged between said shank and nosepiece members 1 and 6 is the radially contractible collet 5 previously referred to, which has formed at its opposite ends frusto-conical seat portions 12 and 13 adapted to engage the respective seats 4 and 11 in surface contact as shown. In order to assure accurate and uniform contraction of the opposite end portions of said collet 5, the large ends of the seats 12 and 13 are relieved as at 14 so as to clear the intersection of the bore 3 and the seat 4 regardless of which end of said collet 5 is inserted into said shank member 1. In other words, by so relieving the end portions of said collet it is unnecessary to form a perfectly sharp corner at the junction of the bore 3 with the seat 4, and likewise it is unnecessary to undercut said shank member at the junction of such surfaces. The collet 5 has a cylindrical exterior of diameter substantially equal to the diameter of the cylindrical bore 3. In actual practice, a clearance of only .0005–.001" is generally allowed whereby said collet has a sliding fit within said shank member 1.

Said collet 5 is slotted axially from opposite ends along perpendicularly related diametral planes whereby to form two pairs of transversely flexible fingers 15, 15 and 16, 16 of arcuate radial cross-section, one pair of such fingers 15, 15 starting at one end of said collet and the other pair 16, 16 starting at the other end. As shown, the slots extend axially throughout the major portion of the length of the cylindrical portion of said collet whereby even though the free ends of the respective fingers of each pair 15, 15 and 16, 16 are flexed transversely toward each other as permitted by the slots, the diameter of the cylindrical portions of said collet across the slots and adjacent the seats 12 and 13 remains substantially constant and in close proximity to the cylindrical bore 3. In this way said collet is accurately supported in said shank member 1 both initially and after a tool has been gripped therein.

When the parts of the collet chuck are assembled as shown in Fig. 1 with the nut 7 rotated so that the seats 4 and 11 in said shank member 1 and in said nosering 10 respectively lightly contact the seats 12 and 13 at the opposite end portions of said collet 5, the latter is accurately located so that its bore 17 is coaxial with said shank member, this being effected not only by the interengagement of the seats 4 and 12 but, as well, by the sliding fit of the cylindrical portion of said collet within the bore 3. Now, if the shank of a tool is inserted through said nose-ring 10 and through the bore 17 of said collet 5, the nut 7 may be tightened to force the nose-ring 10 toward the right and thereby effect a slight rightward movement of said collet and equal flexing of the fingers 15, 15 and 16, 16 at the seat portions 12 and 13 respectively, in the manner of cantilever beams, this equal flexing being due to the opposite and equal inclinations of the seats 4 and 11. Accordingly, the pair of fingers 15, 15 engaging the seat 4 in said shank member 1 will be transversely flexed toward one another to grip the tool shank therebetween, it being noted that such transverse flexing is effected while the opposite edge portions 18, 18 (see Fig. 2) of said fingers adjacent to seat portion 12 remain in close proximity with the surrounding cylindrical bore 3.

The interengagement of the seats 4 and 12 holds that end of said collet 5 in laterally fixed position with respect to said shank member 1, and the close proximity between the edge portions 18, 18 of said fingers 15, 15 with the cylindrical bore 3 at substantially diametrically opposed points which are axially spaced from the seats 4 and 12 precludes tilting of the collet about the seat 4 in a horizontal plane as viewed in Fig. 1.

Similarly, the transverse flexing of the other pair of fingers 16, 16 by relative axial movement of said nose-ring 10 and said collet 5 causes gripping of the tool shank at a region axially spaced from where gripped by the first-mentioned pair of fingers 15, 15, and likewise the edge portions 19, 19 of said fingers 16, 16 are maintained in close proximity with the cylindrical bore 3 of said shank member 1, and since this close proximity is at diametrically opposed points, axially spaced from the seat 4, cocking or tilting of said collet 5 about the seat 4 is prevented in a vertical plane as viewed in Fig. 1. Accordingly, since said collet is held against misalignment both horizontally and vertically by the diametrically opposed points of contact 18, 18 and 19, 19 with the cylindrical bore 3 and also by the interengagement of the collet seat 12 with the shank member seat 3, said collet is at all times maintained coaxial with said shank member 1. Thus, the tool is positioned coaxially when inserted in the collet chuck assembly and also after gripped therein.

In Fig. 2, the transverse flexure of the free ends of fingers 15, 15 and 16, 16 is represented by the arrows 20, 20 and 21, 21 respectively.

The present chuck has particular utility for use in gripping the shanks of taps or like tools where only about .005" or less contraction is required and where other means are provided in association with the chuck for non-rotatably engaging the non-circular cross-section tang on the tool shank, the principal function of the collet in such case therefore being merely to center the tool and to frictionally hold the same from falling out of the chuck.

In summary, it can thus be seen that the component parts of the present chuck can be economically manufactured by ordinary machining and grinding equipment for maintaining the desired dimensional tolerances and concentricities between frusto-conical seats 12 and 13 and the exterior and interior cylindrical surface of said collet and between the bore 3 and seat 4 in said shank member 1.

Moreover, the relative axial movement between the interengaged seats 4 and 12 and 11 and 13 and consequent transverse flexing of the free ends of fingers 15, 15 and 16, 16 has the further effect of longitudinally arching or bowing the fingers and thereby assuring that the intermediate and anchored portions of the respective pairs of fingers will remain in close proximity to the surrounding wall of bore 3. The relative axial movement of the interengaged seats has the still further effect, because of initial surface contact therebetween, of shortening the radius of the cross-section of the respective fingers and thus tend to maintain the edge portions 18, 18 and 19, 19 in close proximity to the surrounding bore 3.

Other modes of applying the principle of the invention may be employed, change being made as regards the details described, provided the features stated in the following claim, or the equivalent of such, be employed.

I therefore particularly point out and distinctly claim as my invention:

A chuck comprising tubular shank and nosepiece members secured together for relative axial movement and formed with opposed inturned seats, and a radially contractible collet slidably fitted in said shank member for a major portion of its axial length and formed with seat portions at opposite ends engaged with the respective seats of said members, one of the pair of seats of said members and of said collet being of generally frusto-conical form and oppositely inclined whereby relative axial movement of said members with said collet engaged therebetween causes radial contraction of the end portions of said collet to grip the shank of a tool adapted to be positioned therein, said collet being held in laterally fixed position at one end relative to said shank member by the engagement of the seat at the corresponding end of said collet with the inturned seat of said shank member, said collet being diametrically slotted from its opposite ends along only two perpendicular diametral planes to provide a pair of integral transversely flexible fingers of arcuate cross-section at each end of said collet, said collet being retained coaxial with said shank member by transverse flexing of said pairs of fingers at opposite ends of said collet while maintaining the opposite edge portions of the respective pairs of fingers in close proximity to the surrounding shank member at pairs of diametrically opposed points axially spaced from the seat of said shank member, said nose-piece member comprising a nose ring which is formed with a seat engaging the seat portion at the other end of said collet and with a surface lying in a plane normal to the axis of said ring, and a nut having threaded engagement with said shank member and having an inturned shoulder providing a surface lying in a plane normal to the axis of said nut and bearing on said surface of said nose ring, said nose ring being laterally unconstrained by said shank and having lateral clearance with said nut whereby said nose ring and the collet portion engaged therewith are retained coaxial with said shank member in spite of eccentricity between said nut and said shank member.

References Cited in the file of this patent

UNITED STATES PATENTS

| 601,395 | Gilbert | Mar. 29, 1898 |
|---|---|---|
| 1,107,483 | Bohlig | Aug. 18, 1914 |
| 1,973,942 | Buhr | Sept. 18, 1934 |
| 2,272,185 | Chittenden | Feb. 10, 1942 |
| 2,360,908 | Stoner | Oct. 24, 1944 |
| 2,465,837 | Benjamin et al. | Mar. 29, 1949 |
| 2,599,026 | Strayer | June 3, 1952 |
| 2,654,611 | Lee | Oct. 6, 1953 |

FOREIGN PATENTS

| 46,263 | Norway | 1929 |